US012551912B1

(12) United States Patent
Potts

(10) Patent No.: US 12,551,912 B1
(45) Date of Patent: Feb. 17, 2026

(54) RAIN GUTTER PAINT SLEEVE

(71) Applicant: James Potts, Gladstone, OR (US)

(72) Inventor: James Potts, Gladstone, OR (US)

( * ) Notice: Subject to any disclaimer, the term of this patent is extended or adjusted under 35 U.S.C. 154(b) by 0 days.

(21) Appl. No.: 19/251,191

(22) Filed: Jun. 26, 2025

Related U.S. Application Data

(60) Provisional application No. 63/683,070, filed on Aug. 14, 2024.

(51) Int. Cl.
*B05B 12/32* (2018.01)

(52) U.S. Cl.
CPC .................................... *B05B 12/32* (2018.02)

(58) Field of Classification Search
None
See application file for complete search history.

(56) References Cited

U.S. PATENT DOCUMENTS 8,439,163 B2 * 5/2013 Inman ..................... E06C 7/183 182/206
8,650,699 B1 * 2/2014 Kovarik .................. A47L 13/10 15/210.1
9,689,206 B2 * 6/2017 Weston ..................... E06C 7/48
2007/0163836 A1 * 7/2007 Jurovich ................. E06C 7/486 182/107
2025/0296112 A1 * 9/2025 Beardslee ............. B05C 21/005

* cited by examiner

*Primary Examiner* — Charles Capozzi
(74) *Attorney, Agent, or Firm* — MARK S HUBERT PC

(57) ABSTRACT

A rain gutter paint sleeve made of a smooth, flexible polymer sleeve that is frictionally fit over an existing K-style gutter of various sizes from a K4 to a K6, prior to spray painting a house. It is designed with an inward biased front face provided by a front bottom corner formed at an acute angle. The sleeve frictionally contacts the rain gutter at the rear back corner, the bottom face front corner, the front face bottom corner and the front face. It is intended to be sold in four-foot lengths and in packages of four or five of these lengths. Its thickness will be much less than that of a conventional polymer rain gutter so that it can easily flex to fit over the various sizes of K-style gutters.

5 Claims, 4 Drawing Sheets

PRIOR ART

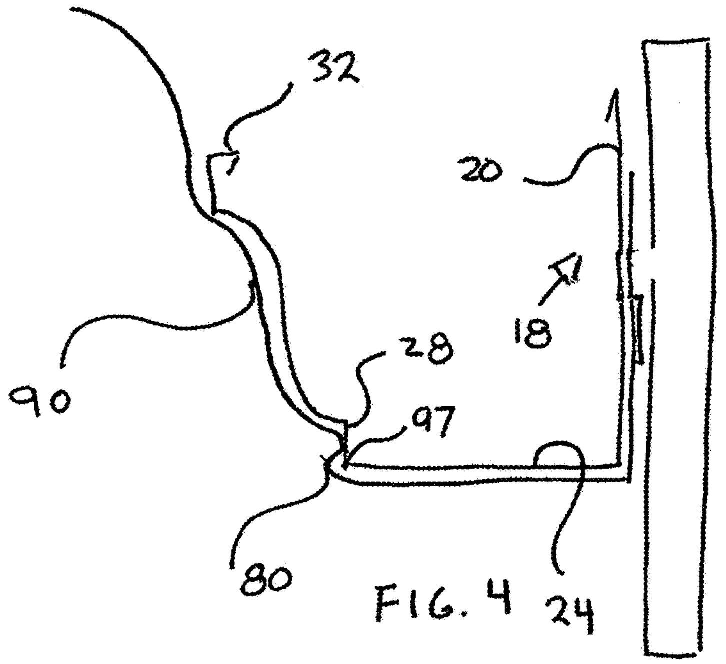
FIG. 4
FIG. 3
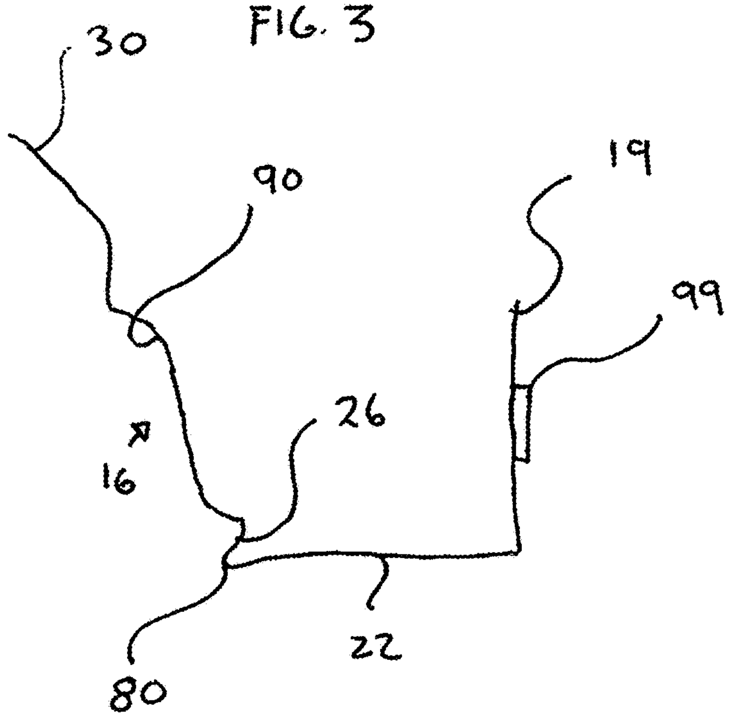

RAIN GUTTER PAINT SLEEVE

CROSS-REFERENCE TO RELATED APPLICATIONS

This APPLICATION CLAIMS THE BENEFIT OF U.S. PROVISIONAL PATENT APPLICATION No. 63/683,070, FILED Aug. 14, 2024, WHICH IS INCORPORATED BY REFERENCE HEREIN IN ITS ENTIRETY.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records but otherwise reserves all copyright rights whatsoever.

FIELD

The present disclosure relates, in general, to building painting, and more particularly to the technology of painting a building with the rain gutters still attached.

BACKGROUND

Today, most buildings are painted by a hydraulic painting spray unit. It is fast and leaves no brush or roller strokes. Since the aim of a commercial painter is to get the job done as quickly as possible, painting buildings with rain gutters poses a problem. The house, including its soffit and fascia, must all be sprayed at the same time, and to complicate things, there cannot be paint on the gutters for two reasons. First, generally gutters are kept a contrasting color from the rest of the house, and second, many gutters are plastic so that paint will not stick to them. To complicate things, if the gutters are left in place and painting paper is taped around them, the overspray from the top front leading edge of the gutter ends up on the first row of roof shingles, for all to see. If the gutters are not taped, then the area of the soffit and fascia around the gutters must all be hand painted which is time consuming. The alternative is to remove the gutters and replace them when the building is painted. All these options slow down a painting job.

Henceforth, a device that could quickly and economically be used to shield both the rain gutters and the roof shingles from paint and overspray while allowing the soffits and facia to be spray painted would fulfill a long-felt need in the painting industry. This invention utilizes and combines known and new technologies in a unique and novel configuration to overcome the problems and accomplish this.

BRIEF SUMMARY

In accordance with various embodiments, a rain gutter paint shield is provided.

In one aspect, a highly smooth, flexible, polymer rain gutter cover that frictionally affixes to a section of rain gutter and that will not accept paint is provided.

In another aspect, a polymer rain gutter paint shield designed to be frictionally affixed to various sizes of K-style rain gutters from a K4 to a K6, is provided.

Various modifications and additions can be made to the embodiments discussed without departing from the scope of the invention. For example, while the embodiments described above refer to features, the scope of this invention also includes embodiments having different combination of features and embodiments that do not include all the above-described features.

BRIEF DESCRIPTION OF THE DRAWINGS

A further understanding of the nature and advantages of embodiments may be realized by reference to the remaining portions of the specification and the drawings, in which like reference numerals are used to refer to similar components.

FIG. 3 is a lateral cross-section view of the primary embodiment rain gutter paint sleeve;

FIG. 4 is a lateral cross-section view of the primary embodiment rain gutter paint sleeve frictionally installed on a K-style rain gutter;

DETAILED DESCRIPTION OF CERTAIN EMBODIMENTS

Figure 1:
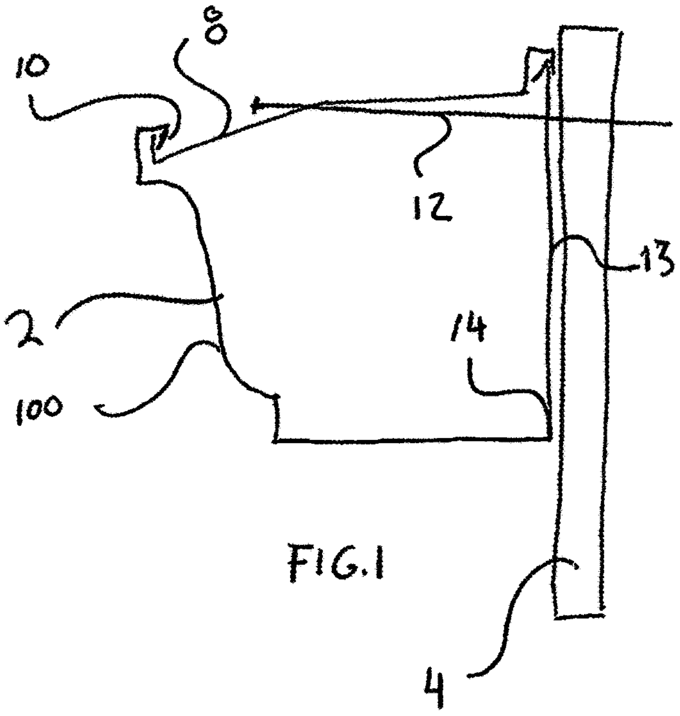
FIG. 1 PRIOR ART
FIGS. 1 and 2 are lateral cross-section views of a conventional K-style gutter showing the two most common methods of hanging onto a building facia.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being “on,” “coupled to,” or “connected to” another element or layer, it can be directly on, directly coupled to or directly connected to the other element or layer, or intervening elements or layers may be present. In contrast, when an element is referred to as being “directly on,” “directly coupled to,” or “directly connected to” another element or layer, there are no intervening elements or layers present. Like numbers refer to like elements throughout. As used herein, the term "and/or" includes all combinations of one or more of the associated listed items.

The terminology used in the description of the inventive concept herein is for the purpose of describing embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The present invention relates to a novel design for a rain gutter paint sleeve. It is a smooth, flexible polymer sleeve that is frictionally fit over an existing K-style gutter of various sizes from a K4 to a K6, prior to spray painting a house. It is intended to be sold in four-foot lengths and in packages of four or five of these lengths. In its preferred embodiment it will be made of polyurethane with an extremely smooth surface finish. Its thickness will be much less than that of a conventional polymer rain gutter so that it can easily flex to fit over the various sizes of K-style gutters.

Figure 2:
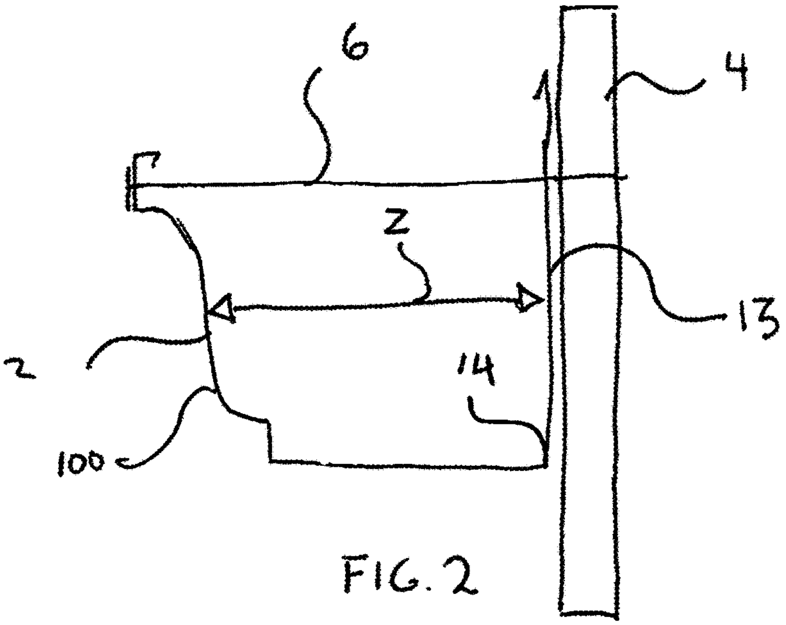

Looking at FIGS. 1 and 2 a conventional K-style rain gutter profile is illustrated. The rain gutter 2 is attached to the building fascia 4 by an aluminum gutter nail 6 that spans across the width of the rain gutter 2 and extends for a depth into the facia 4. (FIG. 2) Alternatively, the rain gutter 2 may utilize a hanger bracket 8 that hooks over the back top edge of the rain gutter 2, traverses across the width of the rain gutter 2, and engages under the front inner lip 10 of the rain gutter 2. (FIG. 1) It is beveled downward from the back of the rain gutter 2 to the front of the rain gutter 2 and a screw 12 is run through an orifice in the hanger bracket 8 to the fascia 4. In either method of mounting, the rain gutter 2 is only attached to the fascia 4 at the top of its rear face 13. This allows the rain gutter 2 to be pulled slightly away from the fascia 4 at its lower rear corner 14.

Figure 6:
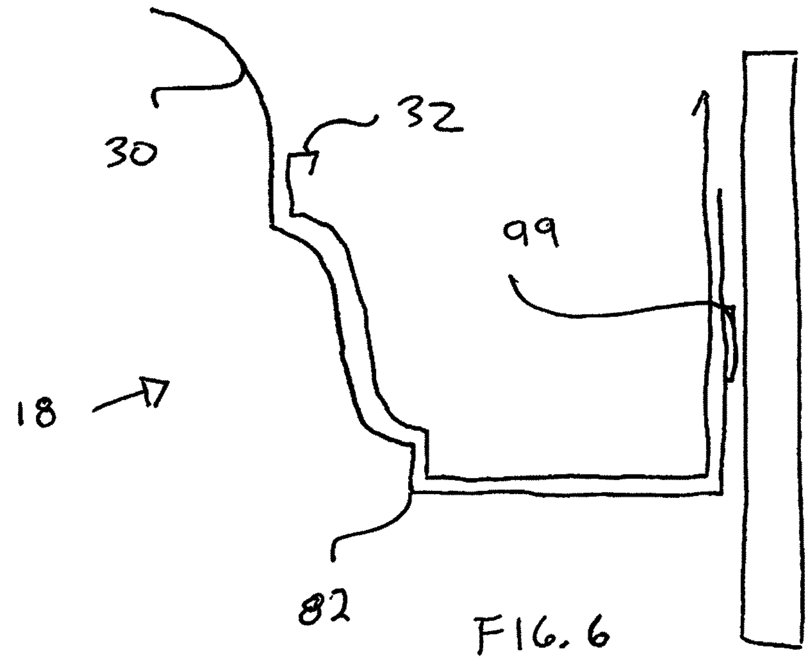
FIG. 6 is a lateral cross-section of the alternate embodiment rain gutter paint sleeve installed on a K-style rain gutter.
Figure 5:
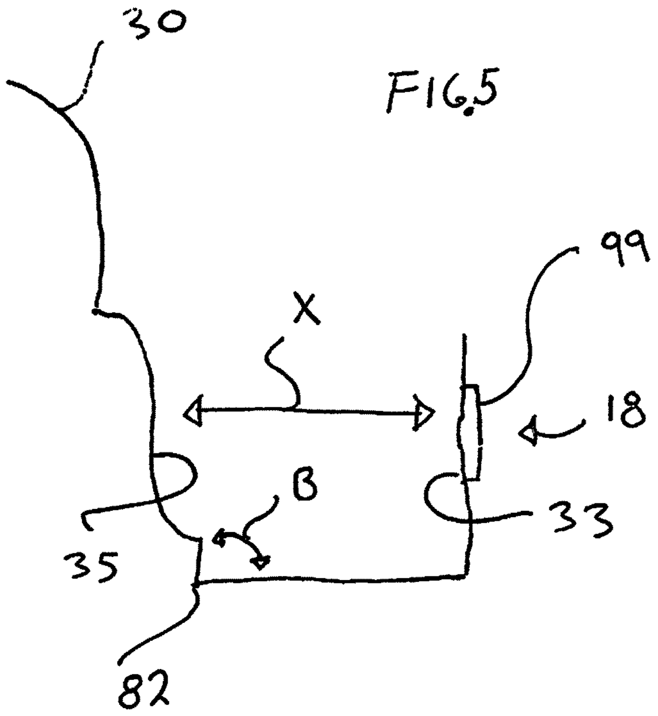
FIG. 5 is a lateral cross-section of an alternate embodiment rain gutter paint sleeve.
Figure 7:
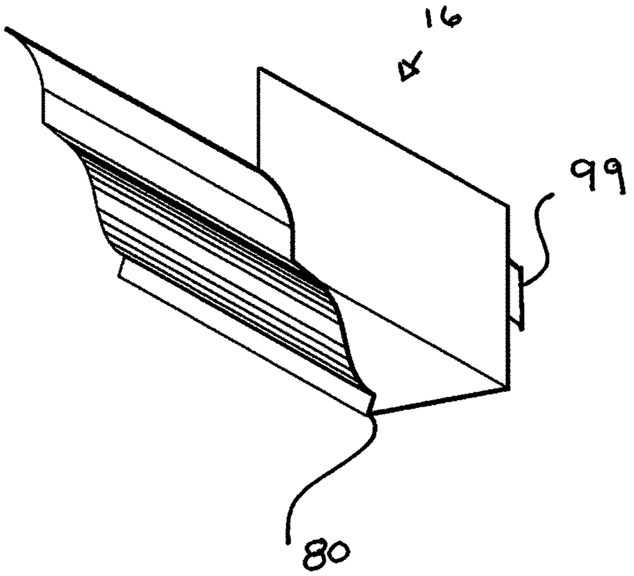
FIG. 7 is a front prospective view of a section of first embodiment rain gutter paint sleeve.
Figure 8:
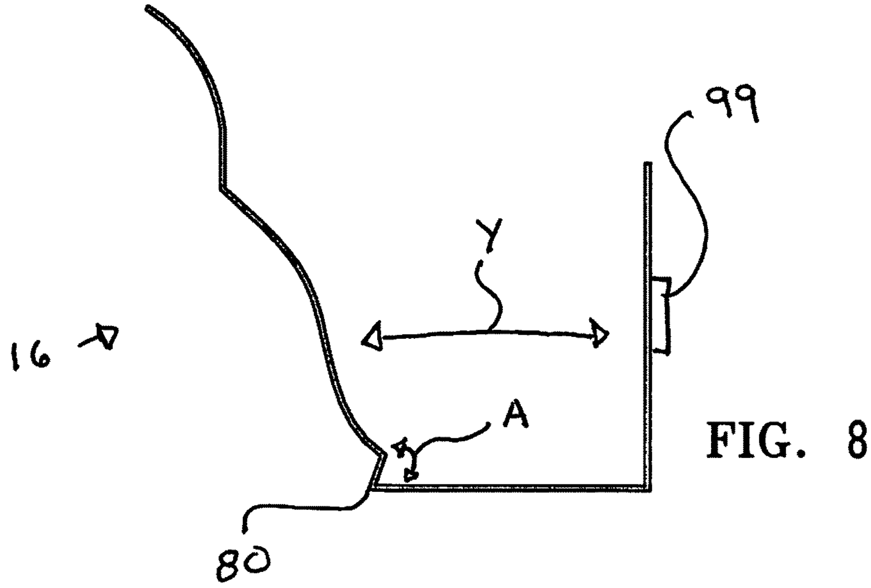
FIG. 8 is a side cross sectional view of the first embodiment rain gutter paint sleeve.

The preferred and alternative embodiment rain gutter paint shields 16 (FIGS. 3, 4, 7 and 8) and 18 (FIGS. 5 and 6) are fabricated from a suitably flexible polymer (such as polyurethane) by extrusion, injection molding or vacuum forming. It is a flexible, concave linear channel with an open distal end and an open proximal end. They are much thinner than conventional polymer rain gutters. This allows them to flex and to have a very light weight per length such that the compressive frictional forces and the optional double-sides tape 99 can hold the shields on in windy conditions and for prolonged periods without falling off. Both the preferred and alternate embodiments haver a cross-sectional inner profile (Y in FIG. 8) and (X in FIG. 5) when installed over a gutter, that is slightly larger than the cross-sectional outer profile of the lateral cross section of a K6 K-style rain gutter, when such that it will fit over the all the sizes of K-style gutters. It is to be noted that their cross-sectional inner profiles before they are fit behind the gutter's back face are narrower than Y and X as both the sleeves 16 and 18 have acute front corner angles that cause the front faces of the shields to angle inward slightly. Only when the shields 16 and 18 are installed over a rain gutter 2 does their cross-sectional profile width exceed the lateral cross-sectional width Z (FIG. 2). of the rain gutters 2. In simpler terms, both the front faces 90 and 92 of the shields 16 and 18 have a slightly inward lean. When installed the apexes of the front corners act as hinges and exert a inward bias of the front face.

The preferred embodiment paint sleeve 16 has a cross-sectional profile that is similar, but different from the cross-section profile of the conventional K-style rain gutter of FIGS. 1 and 2. It differs in that its vertical back face 18 is shorter than the vertical back wall 20 of the gutter 2. This is so the sleeve's back face 19 can frictionally be slid between the rain gutter's back wall 20 and the fascia 4 when the rain gutters 2 is pulled slightly forward to allow for the frictional retention of the sleeve 2 there behind. The bottom plate 22 of the sleeve 2 is also longer than the bottom plate 24 of the rain gutter 2 but it has a concave fold 26 with an apex 80 at its lower leading edge. This forms an acute angle with the bottom planar face 24 of the sleeve and its apex 80 acts as a hinge point for the inner flexing of the front face 90 of the sleeve 16. This hook 26 frictionally pinches the front face 28 of the rain gutter 2 at its front lower corner 97 as well as the forward edge of the bottom face 24 for additional gripping strength. The acute angle also forces the inside of the sleeve's front face 90 into frictional contact with the exterior of slightly smaller gutter's front face 100. Thus, there are four distinct frictional interfaces between the sleeve and the gutter that are caused by the acute angle of the hook and the inward bias of the front face that it imparts. If the hook 26 was not formed with its acute angled front corner (designated angle A in FIG. 8) it would not be able to exert a four-point frictional hold onto the rain gutter 2. The four contact points are at the bottom face rear corner, the bottom face front corner, the front face bottom corner and the front face.

The top front edge 30 of the paint sleeve 16 arcs away and beyond the top front lip 32 of the rain gutter. This sweeping profile serves as a protective lip to prevent any over sprayed paint from reaching the roof shingles where it would be visible.

The alternate embodiment paint sleeve 18 has a cross-sectional profile that other than being slightly larger and having a front acute angle (designated angle B in FIG. 5), resembles that of the K-6 except that its top front edge 30 arcs away and beyond the top front lip 32 of the rain gutter. However, when the paint sleeve 18 is formed with the acute angle B at its outer corner, its front face 35 angles inward to have a smaller diameter X between its vertical back wall 33 and its vertical front wall 35. In this way, when the paint sleeve 18 is opened to fit over the rain gutter 2 it will have more frictional engagement for attachment. Like the preferred embodiment, there are also four distinct frictional interfaces between the sleeve and the gutter that are caused by the acute angle.

In use, the rain gutters 2 is pulled away from the facia 4 by its rear lower corner 19 or 33 and the paint sleeve 16 or 18 can be pried open slightly and slid up between the gutter and the facia. The apex 80 or corner 82 will act as a hinge to allow the front faces of the sleeves to expand outward to fit over the rain gutters 2. Since the vertical back wall 18 of the sleeve is shorter, it can frictionally fit up completely between the rain gutter 2 and the fascia 4 without contacting the mounting nail 6 or screw 12. The sleeve 16 or 18 is fitted over the existing rain gutter 2 and additional friction to hold the sleeve is provided by the acute angle at the front corner or hook 26 of the shields. Since the polymer of the shields is elastically deformable withing the expected range of expansion, there will be an inner compressive force exerted onto the face of the gutters as well as the pinching effect at the front corners. Where the rain gutter 2 does not tightly contact the fascia, a section of double-sided tape 99 may be placed behind the back face 52 of the paint sleeve 16 or 18 to add extra adherence of the paint sleeve to the fascia.

During installation, the individual sleeves will be overlapped at their distal and proximal ends to avoid paint marks at the interfaces between adjacent sleeves. After removal, the sleeves will be twisted about their linear axis to release all the overspray paint from the sleeves' surface such that the sleeves are clean and ready for their next use.

While certain features and aspects have been described with respect to exemplary embodiments, one skilled in the art will recognize that numerous modifications are possible.

Having described and illustrated the principles of the inventive concept with reference to illustrated embodiments, it will be recognized that the illustrated embodiments can be modified in arrangement and detail without departing from such principles and can be combined in any desired manner. And although the foregoing discussion has focused on embodiments, other configurations are contemplated.

Consequently, in view of the wide variety of permutations to the embodiments described herein, this detailed description and accompanying material is intended to be illustrative only and should not be taken as limiting the scope of the inventive concept. What is claimed as the invention, therefore, is all such modifications as may come within the scope and spirit of the following claims and equivalents thereto.

The invention claimed is:

1. A rain gutter paint shield, for the fitment over a K-style rain gutter, comprising:

a flexible, polymer concave linear channel having a cross-sectional profile when installed over a K-style rain gutter, that is larger than the cross-sectional profile of said K-style rain gutter, said concave linear channel having a planar back face, a planar bottom face, a contoured front face, an open top, an open distal end and an open proximal end;

a concave fold formed at the intersection of said planar bottom face and said contoured front face;

an acute angle formed within said concave fold that provides an inward compressive force from said contoured front face onto said K-style rain gutter when said paint shield is installed;

a hinge point at an apex of said concave fold that accommodates an inward to outward movement of said contoured front face; and a top edge of the contoured front face that arcs away from and beyond a height of said K-style rain gutter.

2. The rain gutter paint shield of claim 1 further comprising a section of double-sided adhesive tape affixed to said planar back face.

3. The rain gutter paint shield of claim 1 wherein said planar back face is shorter than a K-style gutter's back face.

4. The rain gutter paint shield of claim 3 further comprising: a pinching force by said concave fold applied at a front corner of said K-style rain gutter when said paint shield is fitted over said K-style rain gutter.

5. The rain gutter paint shield of claim 4 further comprising:

a first contact point between said concave fold and a bottom front corner of said K-style rain gutter when installed;

a second contact point between said concave fold and an outer bottom front face of said K-style rain gutter when installed;

a third contact point between an inner back corner of said paint shield and an outer bottom corner of said K-style rain gutter when installed; and a fourth contact point between an inner side of said contoured front face of said paint shield and an outer face of said K-style rain gutter when installed.

* * * * *